(12) United States Patent
Rogers

(10) Patent No.: US 11,080,994 B2
(45) Date of Patent: Aug. 3, 2021

(54) SMART ROAD SENSOR

(71) Applicant: SENSIML CORPORATION, Beaverton, OR (US)

(72) Inventor: Christopher B. Rogers, Beaverton, OR (US)

(73) Assignee: SENSIML CORPORATION, Beaverton, OR (US)

( * ) Notice: Subject to any disclaimer, the term of this patent is extended or adjusted under 35 U.S.C. 154(b) by 0 days.

(21) Appl. No.: 16/682,423

(22) Filed: Nov. 13, 2019

(65) Prior Publication Data

US 2020/0152053 A1 May 14, 2020

Related U.S. Application Data

(60) Provisional application No. 62/760,654, filed on Nov. 13, 2018.

(51) Int. Cl.
*G08G 1/00* (2006.01)
*G08G 1/01* (2006.01)
*G06N 20/00* (2019.01)
*G06Q 50/30* (2012.01)

(52) U.S. Cl.
CPC .......... *G08G 1/0112* (2013.01); *G06N 20/00* (2019.01); *G06Q 50/30* (2013.01); *G08G 1/0125* (2013.01)

(58) Field of Classification Search
CPC .. G08G 1/0112; G08G 1/0125; G08G 1/0116; G06N 20/00; G06Q 50/30
See application file for complete search history.

(56) References Cited

U.S. PATENT DOCUMENTS

2009/0303052 A1\* 12/2009 Aklepi ................... G06Q 10/08
340/573.2
2010/0286899 A1\* 11/2010 Jain ........................ G08G 1/127
701/119

\* cited by examiner

*Primary Examiner* — Ojiako K Nwugo
(74) *Attorney, Agent, or Firm* — Miller Nash LLP

(57) ABSTRACT

A road sensor has a housing, at least one sensor inside the housing, a processor inside the housing, the processor configured to execute instructions to cause the processor to: receive data from the at least one sensor; use machine learning to recognize conditions local to the sensor from the sensor data; and provide an output signal of the conditions. A method of providing road conditions includes receiving, at a road sensor, input detectable by at least one sensor, using a processor in the road sensor to execute code that will cause the processor to: receive sensor data from the at least one sensor; apply machine learning to the sensor data to recognize at least one road condition associated with the sensor data; and transmit an output signal identifying the road conditions.

19 Claims, 3 Drawing Sheets

SMART ROAD SENSOR

RELATED APPLICATIONS

This application is a continuation of, and claims priority to, U.S. Provisional Patent Application No. 62/760,654, filed Nov. 13, 2018, which is incorporated herein by reference in its entirety.

TECHNICAL FIELD

This disclosure relates to road sensors, more particularly to road sensors that use machine learning and are connected to a network.

BACKGROUND

The ability of computing devices to gather and process data has become ubiquitous. Many different objects now have the ability to process raw sensor data and communicate key insights that raw data and local intelligent algorithms resident within the object. Other computing devices can then further process the information and combine it with similar communications from many other such devices for still additional insight. This opens up many different types of information that can be gathered and processed to provide real-time information to any interested people or automated control applications.

One area in which these devices would be especially useful would be in traffic monitoring and predictions. Most systems rely upon difficult and expensive to install traffic cameras, pressure and/or magnetic sensors to determine when and where vehicles are located. It would be useful to have far more ubiquitous, low-cost objects that can collect rich sensor inputs and filter the extraneous raw sensor data using machine learning to communicate more efficiently only the useful information for traffic monitoring and prediction. A distributed system could process raw sensor data locally within the object and that is practical to deploy densely along the majority of roadways could not only provide much better insight and prediction into traffic patterns but also convey important feedback in real-time to improve driver safety and efficiency.

DETAILED DESCRIPTION OF THE EMBODIMENTS

FIGS. 1-4 show different views of an embodiment of a smart road sensor. The same references number are used to refer to the same components in each drawing. To avoid confusion, the term 'road sensor' will refer to the entire assembly, and the term 'sensor' will refer to individual sensors located within the road sensor.

Figure 1:
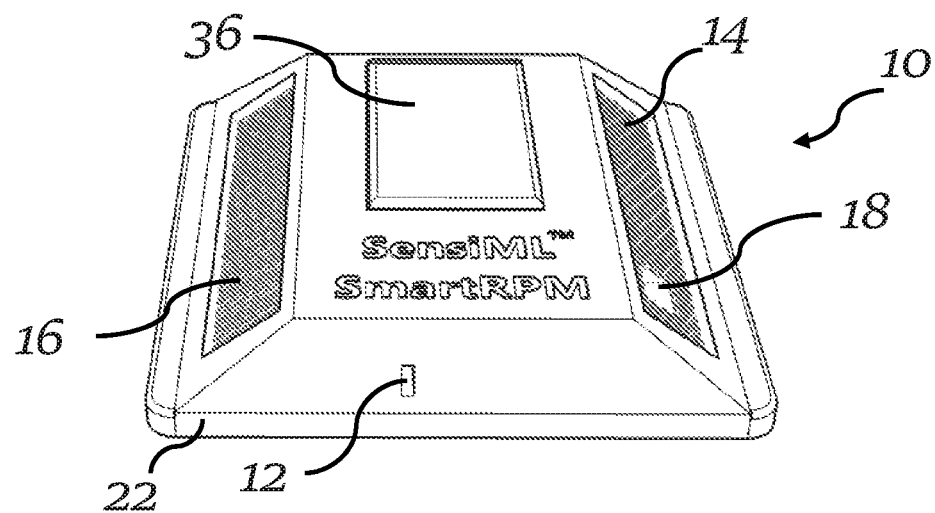
FIG. 1 shows a fully assembled view of an embodiment of a ubiquitous smart road sensor.

FIG. 1 shows a fully assembled view an embodiment of a ubiquitous smart road sensor 10. This road sensor may replace the low-profile road reflectors, also known as a raised pavement marker, commonly found in various places on city streets and highways. Typically, they reside in areas of traffic changes, on or next to speed bumps, intersections, shoulder or center lane divider lines, in parking lots, or private fleet holding and operating facilities, etc. From the exterior they look very similar to these existing markers, but they have many more capabilities.

The housing 22 has the same profile and shape as the typical raised pavement marker. It contains two reflectors 14 and 16, but the reflector 14 includes a region 18 on the reflector that acts as a window for a status or warning light, which may be coupled with a light pipe, as discussed in more detail below. The housing may also accommodate a microphone or other acoustic sensor for recording of road sounds by including a microphone port 12.

Figure 2:
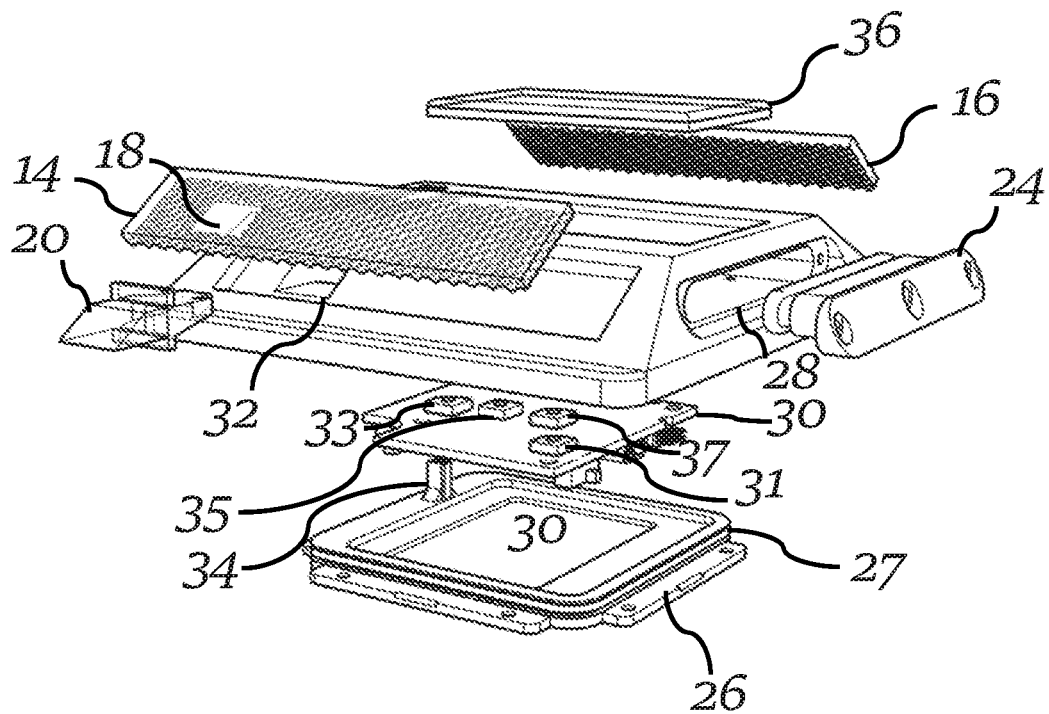
FIG. 2 shows an exploded view of an embodiment of a ubiquitous smart road sensor.

The housing 22, as shown in the exploded view of FIG. 2, also includes a port 32 for an LED light pipe 20 that mates with the region 18 on the reflector 14 when assembled. The light pipe 20 couples with one or more LEDs on the printed circuit board (PCB) 30. The housing also may accommodate a photovoltaic cell 36 on its top surface to provide power to charge a battery 31 either incorporated into PCB 30 or connected as a separate battery element to PCB 30. In one embodiment, the battery is a lithium polymer rechargeable battery pack connected by a wired plug to PCB 30. Other embodiments may use other battery technologies such as alkaline, zinc-carbon, lithium, NiMH, or NiCd.

Figure 3:
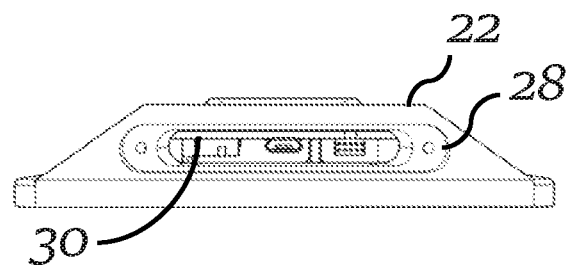
FIG. 3 shows a side view of an embodiment of a ubiquitous smart road sensor.

The housing 22 also has an access port 28, accessible by removal of the access port cover 24, shown in the side view of FIG. 3. Given the environment in which these road sensors will operate, the access port cover will be water tight, such as being sealed by an O-ring or gasket to prevent entry of water. As shown in the side view, the PCB 30 is accessible through the access port 28 for upgrades and repairs. Other embodiments may exclude such access and simply be sealed enclosures without the possibility of upgrade or repair.

Figure 4:
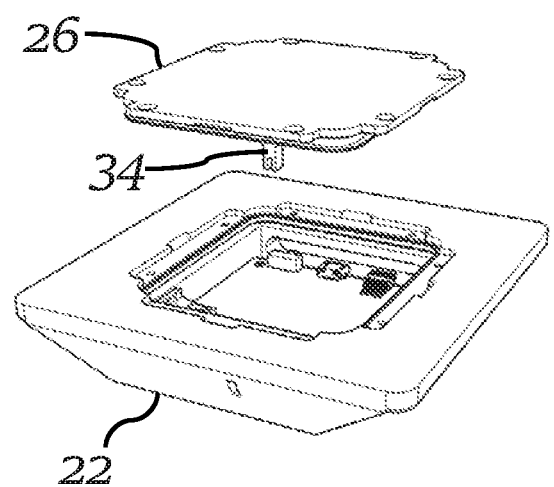
FIG. 4 shows a bottom view of an embodiment of a ubiquitous smart road sensor.

The access port 28 allows access without having to remove the sensor from its location and without removal of the bottom cover 26 shown in the bottom view of FIG. 4. As with the access port cover 24, the bottom cover will have a water-tight seal, like an O-ring 27, gasket, or other water barrier in the cover. Similarly, the microphone port will have a water-resistant acoustic channel and membrane such as 34. In one embodiment, the microphone 33 is a microelectromechanical system (MEMS)-based microphone. As shown in the bottom view, the microphone acoustic channel and membrane 34 resides on the bottom cover and mates with the microphone 33 on the PCB 30, shown in FIG. 2, and microphone port 12 in housing 22, shown in FIG. 1, to provide environmental protection.

The PCB 30 may also contain one or more mechanical vibration sensors such as 37, shown in FIG. 2. These may include accelerometers, strain gauges, velocity sensors, gyroscopes, pressure sensors, vibration meter sensors, inertial measurement units, etc. The sensors may also include temperature and moisture sensors to allow monitoring of ice/wet road conditions, etc. The sensors may also include optical sensors such as infrared, passive infrared, charge-coupled device CCD or CMOS image sensors, or UV sensors to gather visual raw data on passing vehicles and road conditions, or provide specific vehicle identification from visual license plate and vehicle recognition. The sensors may include distance and ranging sensors such as ultrasonic, LIDAR, radar, or other RF transceivers used for time-of-flight distance and speed calculation of passing vehicles.

In operation, the road sensor can provide information in a local mode, a connected mode, or both. The processor 35 on the PCB will have undergone machine learning based 'training' to 'teach' it the different patterns of sound, vibration, and other sensor data that correspond to traffic insight events of interest. This occurs prior to its installation but may include ongoing learning from data gathered during operation used to update and improve the algorithm.

Training is typically used in a machine-learning or artificial intelligence type of system. The system is trained using sets of data that have known conditions, and the system 'learns' to recognize the pattern in the data that leads to the conclusion of the known condition. This allows the processor to execute software or firmware instructions to analyze the combination of sensor data, 'recognize' the conditions and provide an output signal identifying the conditions. In the local mode, the system would be installed 'pre-trained' so there would be no further externally sourced training. Already-installed smart road sensors could receive an updated or newly trained PCB through either the access port, or a local communication link, typically located on the processor, could transmit updates to the software/firmware in the sensor by a maintenance team, on updated software/firmware could be remotely delivered by a cellular network or wireless network. In the connected mode, the sensor's training could be updated using new data sets during off-times when there is little or no traffic. Additionally, the sensor may transmit or integrate new raw sensor data it has measured that do not fit within the classifications for which the device was initially programmed to recognize. This novel data is then used by the machine learning algorithms either integrated in the processor or performed externally to revisit the machine learning algorithm used by the processor.

Figure 5:
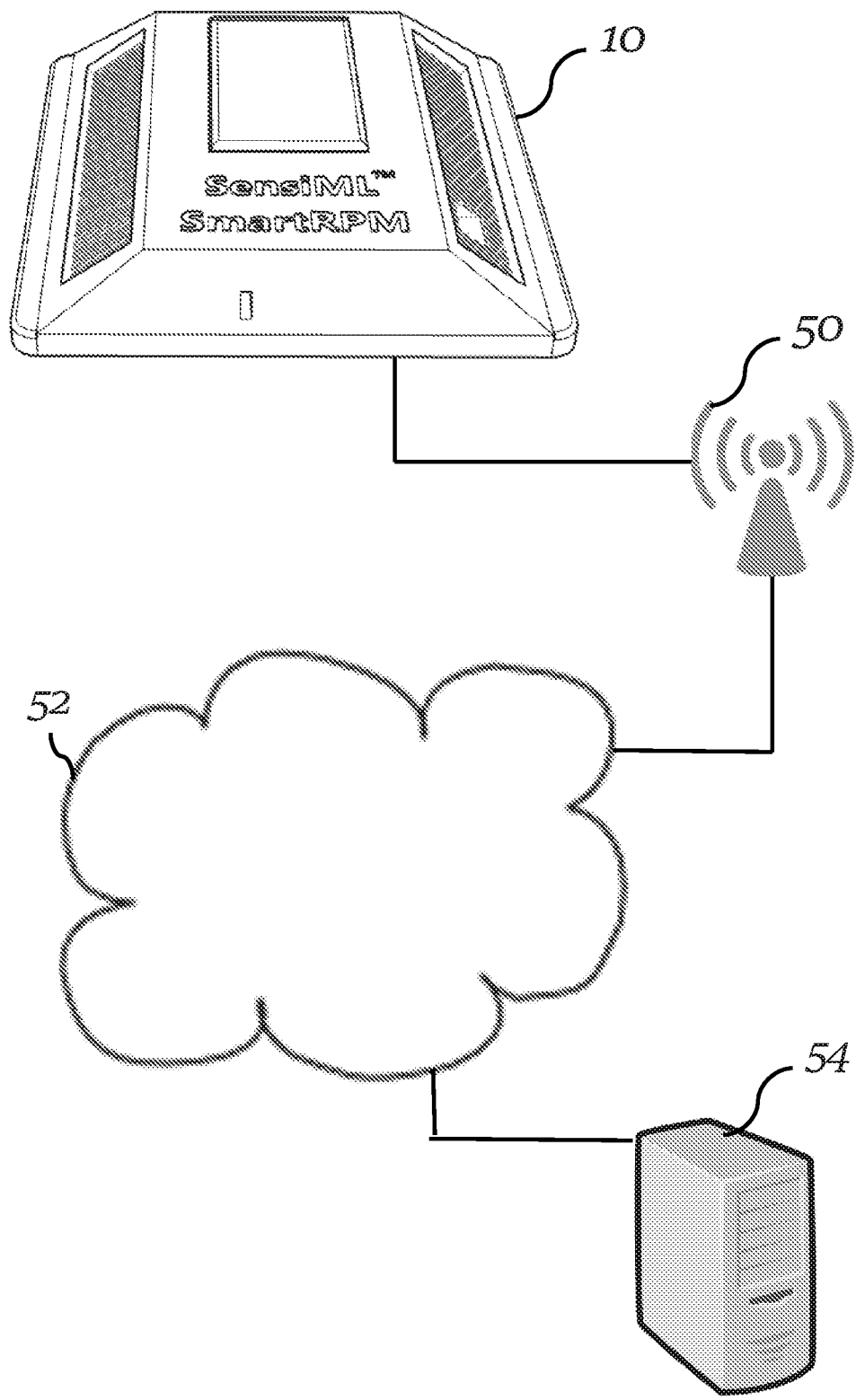
FIG. 5 shows an embodiment of a network-connected road sensor.

FIG. 5 shows an embodiment of a smart road sensor 10 operating in a connected mode. The smart road sensor 10 connects to a wireless or cellular network 52 through an access point such as 50. The access point could be a local network access point, or even a cellular phone used by a repair or maintenance technician that can link with the sensor and then access a cellular network.

In either the connected or local modes, the processor will monitor the various sensors, such as the vibration sensors and the microphone, and fuse their results to determine if the patterns match heavy traffic, stopped traffic, or normal traffic conditions, among others. The algorithms can combine the various sensor data to allow the device to count vehicles, discern different vehicle classes or types, and direction of travel, among others. Possessing an onboard real-time clock, the processor can timestamp all detected vehicle traffic events with a specific time and date to allow greater insight into traffic density and patterns in time. The sensor can also utilize the various sensor data to classify other useful vehicle attributes of passing traffic such as whether or not a vehicle has traction devices such as studs or snow chains installed, or has mechanical defects like faulty or damaged tires, or exhaust equipment producing excessive noise. The sensor can also utilize the various sensor data to classify road attributes not specific to any one vehicle such as noise and vibration indicative of a nearby pothole or roadway damage, temperature and moisture suggesting dangerous icing conditions, or likelihood of a detected traffic incident or accident. Depending upon the determination, the sensor may then provide an LED-based signal, visible to local drivers or road crews that indicate the condition. This may involve different color LEDS, or different flashing patterns, to indicate different traffic or environmental conditions.

In a connected mode, the sensor may connect to a gateway device, network access point, or cellular base station, shown as 50 in FIG. 5. The sensor could then have the ability to send its sensor-based insight information via one or more wireless networks to a centralized server or servers such as 54, a distributed processing node or gateway, or other nearby ubiquitous road sensor devices. Such wireless communication might utilize low power personal area network communications, like 6LoWPAN (IPv6 over Low Power Personal Area Networks), Zigbee, or Bluetooth®, wireless local area network connections such as Wi-Fi. Such wireless communication might also utilize cellular IoT (Internet of Things) networks like LTE Cat-M1 (Long Term Evolution Category M1), LoRA (Long Range), or NB-IoT (Narrowband IoT). The device could transmit the processed insights on local traffic and environmental conditions to a traffic management system that could provide users with real-time information viewable on an application, web browser, or other interface.

In this manner, the ubiquitous smart road sensor provides local traffic and environmental roadway condition insights to a variety of users. Such users might include traffic planners, local transportation operational personnel, highway safety or police, fleet or commercial vehicle operators, parking lot owners and operators, or individual drivers. The road sensor looks very similar to the current road reflectors, allowing them to be changed out very easily. The road sensors may be self-contained and self-powering, and may operate in a local mode, a connected mode, or both.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A road sensor, comprising:
 a housing having a same profile and shape as a raised pavement marker;
 at least one sensor inside the housing;
 a processor inside the housing, the processor configured to execute instructions to cause the processor to:
  receive data from the at least one sensor;
  use machine learning to recognize conditions local to the sensor from the sensor data; and
  provide an output signal of the conditions.

2. The road sensor as claimed in claim 1, wherein the housing further includes at least one reflector.

3. The road sensor as claimed in claim 2, wherein the at least one reflector includes at least one reflector having a window.

4. The road sensor as claimed in claim 3, wherein the road sensor includes a light emitting diode.

5. The road sensor as claimed in claim 3, wherein the road sensor includes a light pipe positioned to pass light from the light emitting diode to the window.

6. The road sensor as claimed in claim 5, wherein the road sensor includes a photovoltaic cell electrically connected to the battery to provide charge to the battery.

7. The road sensor as claimed in claim 1, wherein the road sensor includes an access port positioned to allow access to an inside of the housing when the road sensor is installed.

8. The road sensor as claimed in claim 1, wherein the road sensor includes a battery.

9. The road sensor as claimed in claim 1, wherein the at least one sensor includes at least one selected from the group consisting of: an accelerometer; a strain gauge; velocity sensor; a gyroscope; a pressure sensor; a vibration meter; an inertial measurement unit; a microphone; optical sensors; infrared sensors; charge-coupled devices (CCD); CMOS image sensors; UV sensors; distance and ranging sensors; ultrasonic sensors; light detection and ranging (LIDAR); radar; and radio frequency transceivers.

10. A method of providing road conditions, comprising:
  receiving, at a road sensor, input detectable by at least two sensors located in the road sensor;
  using a processor in the road sensor to execute code that will cause the processor to:
    receive sensor data from the at least two sensors located in the road sensor;
    apply machine learning to the sensor data to recognize at least one road condition associated with the sensor data; and
    transmit an output signal identifying the road conditions.

11. The method as claimed in claim 10, wherein the processor further executes instructions that cause the road sensor to operate locally.

12. The method as claimed in claim 10, wherein the processor further executes instructions that cause the road sensor to operate in a connected mode.

13. The method as claimed in claim 12, wherein the instructions that cause the road sensor to operate in a connected mode cause the processor to connect to a network through an access point.

14. The method as claimed in claim 13, wherein the instructions that cause the road sensor to operate in a connected mode cause the processor to connect to a network through an access point cause the processor to connect to an Internet Protocol network.

15. The method as claimed in claim 13, wherein the instructions that cause the road sensor to operate in a connected mode cause the processor to connect to a network through an access point cause the processor to connect to a cellular network.

16. The method as claimed in claim 10, further comprising providing an update to the processor by one of: replacing the processor; using a local communications link to update the processor; or using a network connection to update the processor.

17. The method as claimed in claim 10, further comprising providing an update to the network, the update comprised of sensor data not already classifiable by the locally processed code.

18. The method as claimed in claim 17 wherein providing an update further comprises using a local communications link to update the network.

19. The method as claimed in claim 17, wherein providing an update further comprises using a network connection to update the network.

* * * * *